(12) United States Patent
Tsuji et al.

(10) Patent No.: US 12,263,761 B2
(45) Date of Patent: Apr. 1, 2025

(54) SEAT STATE DETECTION APPARATUS

(71) Applicant: TOYO DENSO KABUSHIKI KAISHA, Tokyo (JP)

(72) Inventors: Haruhiko Tsuji, Saitama (JP); Takuma Sumiya, Saitama (JP); Hiroaki Endo, Saitama (JP)

(73) Assignee: TOYO DENSO KABUSHIKI KAISHA, Tokyo (JP)

( * ) Notice: Subject to any disclaimer, the term of this patent is extended or adjusted under 35 U.S.C. 154(b) by 255 days.

(21) Appl. No.: 18/080,122

(22) Filed: Dec. 13, 2022

(65) Prior Publication Data

US 2023/0202352 A1     Jun. 29, 2023

(30) Foreign Application Priority Data

Dec. 27, 2021    (JP) ................. 2021-212183

(51) Int. Cl.
*B60N 2/02*     (2006.01)
*B60N 2/00*     (2006.01)

(52) U.S. Cl.
CPC ......... *B60N 2/0276* (2013.01); *B60N 2/0025* (2023.08); *B60N 2/0244* (2013.01); *B60N 2/0272* (2023.08); *B60N 2210/42* (2023.08); *B60N 2210/50* (2023.08); *B60N 2220/10* (2023.08); *B60N 2220/20* (2023.08)

(58) Field of Classification Search
CPC .. B60N 2/0276; B60N 2/0025; B60N 2/0244; B60N 2210/42; B60N 2220/20; B60N 2/0272; B60N 2210/50; B60N 2220/10
See application file for complete search history.

(56) References Cited

FOREIGN PATENT DOCUMENTS

JP         2007-131138 A      5/2007

*Primary Examiner* — Michael D Lang
(74) *Attorney, Agent, or Firm* — IP Business Solutions, LLC

(57) ABSTRACT

A seat state detection apparatus according to the present invention includes: a detecting unit configured to, in accordance with a moving operation in a front-rear direction by an operator on a seat of a vehicle, detect a moving status value representing a status of a moving mechanism that moves the seat in the front-rear direction; and a determining unit configured to determine that the moving mechanism is in a first state when the detected moving status value is more than a first threshold value, and determine that the moving mechanism is in a second state when the detected moving status value is less than a second threshold value set to a value lower than the first threshold value.

16 Claims, 7 Drawing Sheets

SEAT STATE DETECTION APPARATUS

INCORPORATION BY REFERENCE

This application is based upon and claims the benefit of priority from Japanese patent application No. 2021-212183, filed on Dec. 27, 2021, the disclosure of which is incorporated herein in its entirety by reference.

TECHNICAL FIELD

The present invention relates to a seat state detection apparatus that detects the state of the seat of a vehicle.

BACKGROUND ART

A seat installed in a vehicle is equipped with a moving mechanism that enables a sliding movement in the front-rear direction. A passenger operates the seat to slide in accordance with his/her body shape and posture, and the seat is thereby slid in the front-rear direction by the moving mechanism.

When the seat of the vehicle is slid in the front-rear direction, a foreign object may be caught. In particular, when the seat is slid rearward, it is difficult for the operator to check the status of the rearward, and a person, luggage or the like on the rear seat may be caught. For this reason, Patent Document 1 describes a technique for detecting that a foreign object is pinched when the seat is moved. Specifically, in Patent Document 1, the variation of the driving force of the seat is measured, and it is detected from the amount of the variation that a foreign object is pinched.
Patent Document 1: Japanese Unexamined Patent Application Publication No. JP-A 2007-131138

However, with the technique described in Patent Document 1 above, there arises a problem that it becomes difficult to accurately detect the pinch in some states of the vehicle. For example, in a case where the vehicle is in the state of climbing a slope, a rearward load is applied to the seat and, when the seat is slid in this state, the variation of the driving force rearward the seat cannot be properly measured. As a result, there arises a problem that it becomes difficult to accurately detect the state of the sheet.

SUMMARY OF THE INVENTION

Accordingly, an object of the present invention is to solve the abovementioned problem that the state of the seat of a vehicle cannot be accurately detected.

A seat state detection apparatus as an aspect of the present invention includes: a detecting unit configured to, in accordance with a moving operation in a front-rear direction by an operator on a seat of a vehicle, detect a moving status value representing a status of a moving mechanism that moves the seat in the front-rear direction; and a determining unit configured to determine that the moving mechanism is in a first state when the detected moving status value is more than a first threshold value, and determine that the moving mechanism is in a second state when the detected moving status value is less than a second threshold value set to a value lower than the first threshold value.

Further, a seat state detection method as an aspect of the present invention includes: in accordance with a moving operation in a front-rear direction by an operator on a seat of a vehicle, detecting a moving status value representing a status of a moving mechanism that moves the seat in the front-rear direction; and determining that the moving mechanism is in a first state when the detected moving status value is more than a first threshold value, and determining that the moving mechanism is in a second state when the detected moving status value is less than a second threshold value set to a value lower than the first threshold value.

Further, a seat state detection apparatus as another aspect of the present invention includes: a detecting unit configured to, in accordance with a moving operation in a front-rear direction by an operator on a seat of a vehicle, detect a moving status value representing a status of a moving mechanism that moves the seat in the front-rear direction; and a determining unit configured to determine that the moving mechanism is in a first state when the detected moving status value is less than a first threshold value, and determine that the moving mechanism is in a second state when the detected moving status value is more than a second threshold value set to a value higher than the first threshold value.

With the configurations as described above, the present invention enables accurate detection of the state of the seat of a vehicle.

EXAMPLE EMBODIMENT

First Example Embodiment

Figure 7:
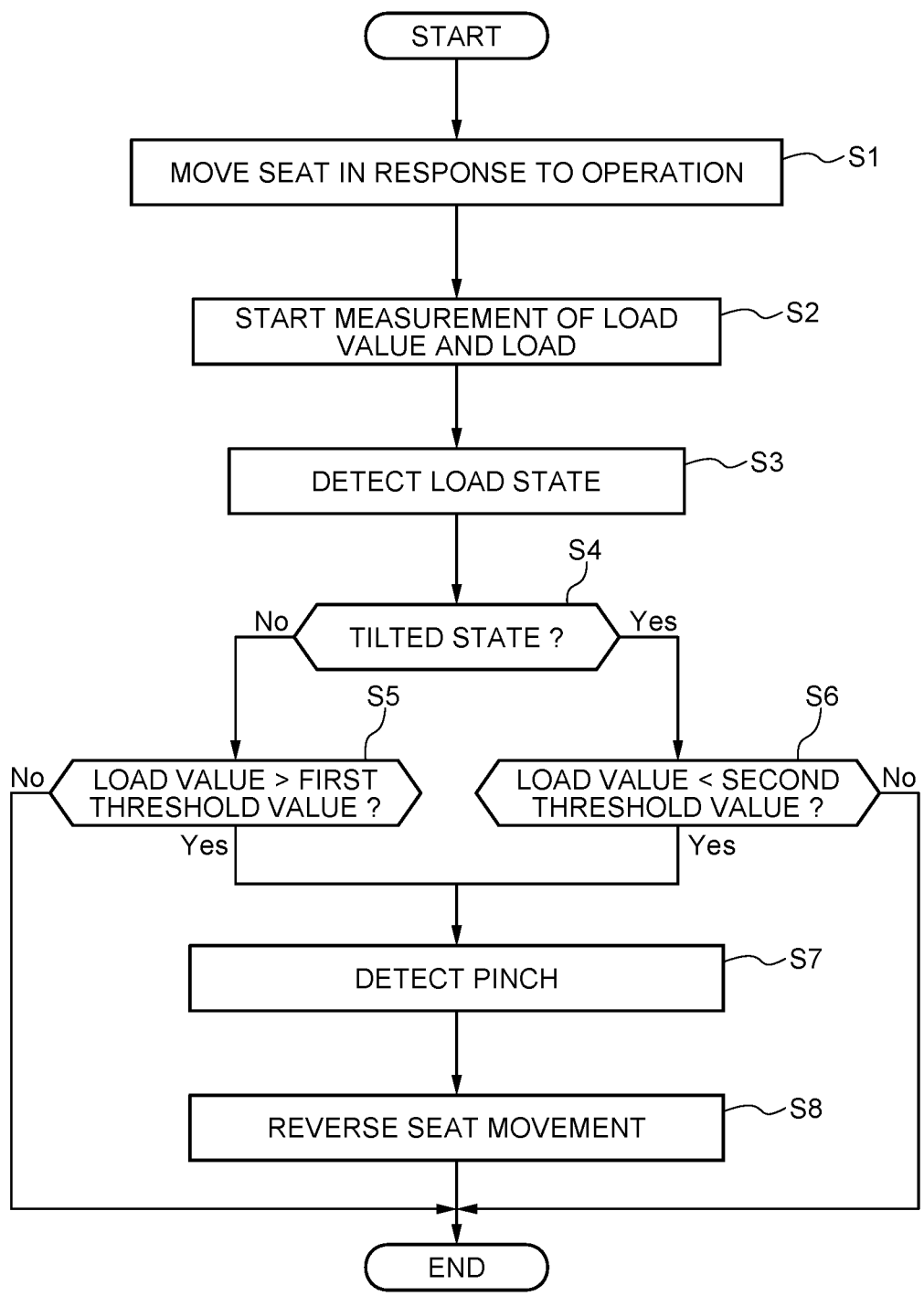
FIG. 7 is a flowchart showing an operation of the control device disclosed in FIG. 1.

A first example embodiment of the present invention will be described with reference to FIGS. 1 to 7. FIGS. 1 to 6 are figures for describing a configuration of a seat state detection apparatus, and FIG. 7 is a figure for describing an operation of the seat state detection apparatus.

The seat state detection apparatus according to the present invention detects the state of a seat installed in a vehicle. In particular, the seat state detection apparatus in this example embodiment detects a state that a foreign object is pinched by the seat when the seat is slid in the front-rear direction.

Figure 1:
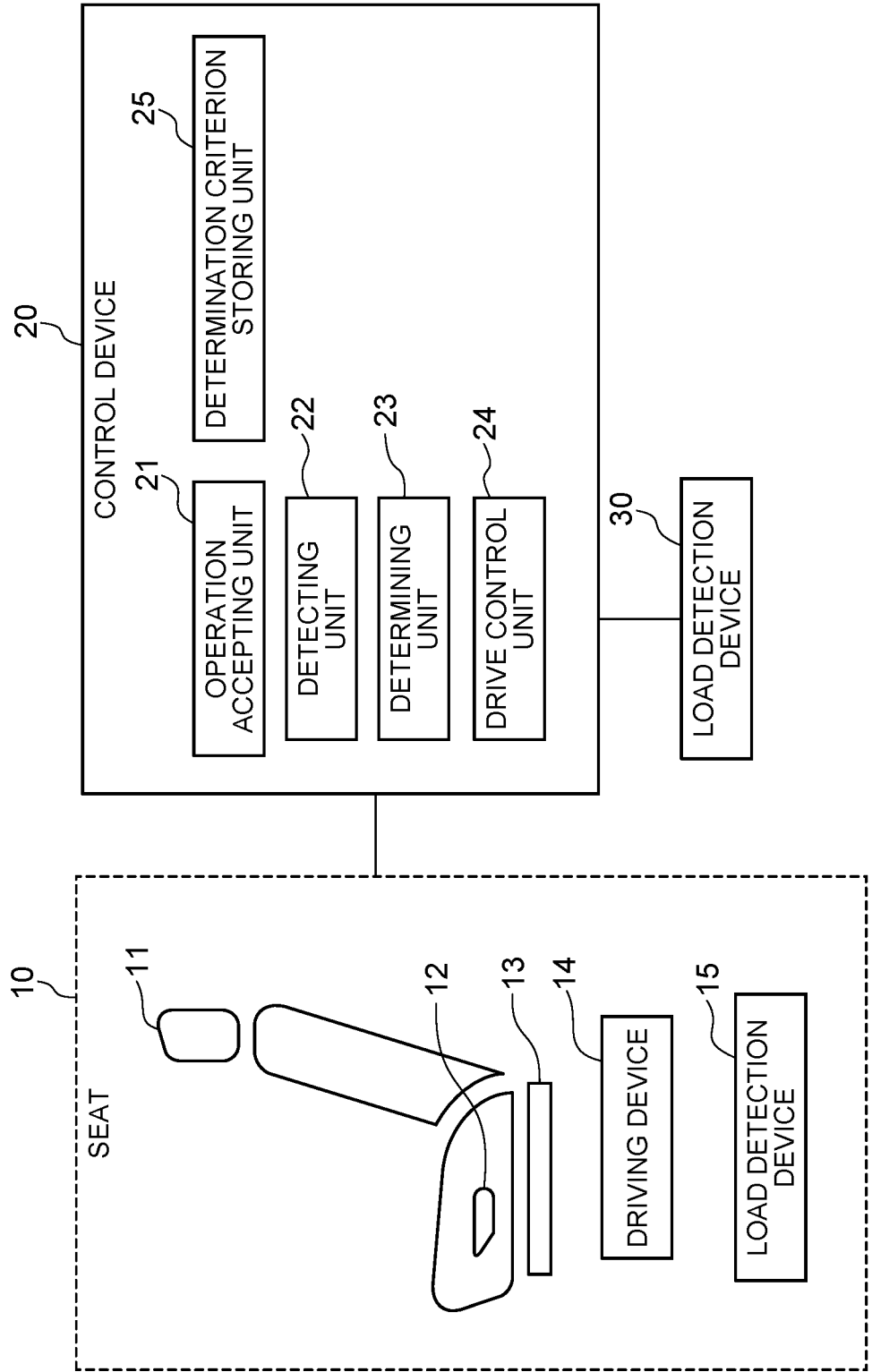
FIG. 1 is a figure showing a configuration of a seat state detection apparatus in a first example embodiment of the present invention.

As shown in FIG. 1, a seat 10 installed in the vehicle includes a seat body 11, an operating unit 12 that inputs an operation instruction to the seat body 11, a slide mechanism 13 that slides the seat body 11 in the front-rear direction, a driving device 14 that drives the slide mechanism 13, and a load detection device 15 that detects the value of a load applied to the slide mechanism 13. The seat 10 also includes another moving mechanism (not illustrated) that enables a component such as a back face part of the seat body 11 to move. The respective components will be described in detail below.

In this example embodiment, the operating unit 12 has a switch by which the operator inputs an operation instruction for sliding the seat body in the front-rear direction. The operating unit 12 then outputs the input operation instruction to the control device 20. The operating unit 12 also has a switch for inputting an instruction to enable another component of the seat body 11 to move.

Figure 2:
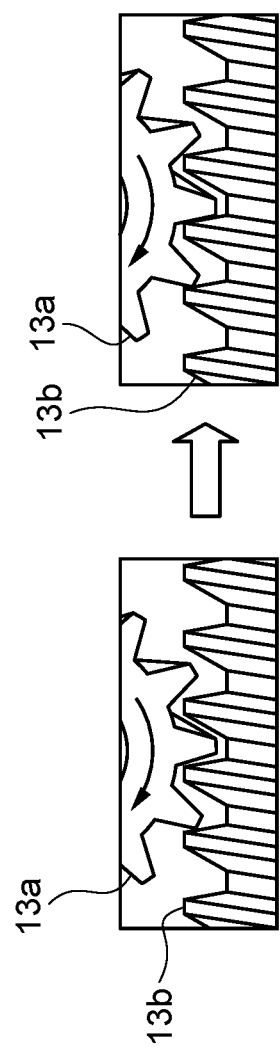
FIG. 2 is a figure showing a way of an operation of a driving mechanism of a seat disclosed in FIG. 1.

In this example embodiment, the slide mechanism 13 (moving mechanism) is configured by a rack and pinion mechanism as shown in FIG. 2, for example. The slide mechanism 13 is configured to move the seat body 11 in the front-rear direction by a pinion 13a on the seat body 11 engaging with a rack 13b on the vehicle extending in the front-rear direction, rotating, and moving on the rack 13b. Correspondingly, the driving device 14 is configured by a motor that rotationally drives the pinion 13a in accordance with an instruction from the control device 20 as will be described later. This example embodiment illustrates a case where the slide mechanism 13 has the pinion 13a on the seat body 11 and the rack 13b on the vehicle, but on the contrary, the slide mechanism 13 may have the rack on the seat body 11 and the pinion on the vehicle. Moreover, in the rack and pinion mechanism, the pinion 13a is rotationally driven by the motor in the above description, but the rack 13b may be rotationally driven. Furthermore, in the present invention, the slide mechanism is not limited to being a rack and pinion mechanism, and may be configured by any mechanism.

The load detection device 15 (detecting unit) is configured to measure the values of voltage and current applied to the motor that rotationally drives the pinion 13a and detect the driving force of the motor calculated from the measured values as the value of a load applied to the slide mechanism 13. For example, the value of a load applied to the slide mechanism 13 detected by the load detection device 15 is shown by a graph represented by the driving force on the vertical axis in FIG. 4. A load value (driving force) detected by the load detection device 15 is output to the control device 20. However, the load detection device 15 is not limited to detecting the value of a load applied to the slide mechanism 13, and may detect a moving status value that is any value indicating the status of the slide mechanism 13 that moves the seat body 11 in the front-rear direction. For example, the load detection device 15 may measure the pulse frequency of the motor serving as the driving device 14 to calculate a moving speed in the front-rear direction of the seat body 11, and detect the moving speed as a moving status value representing the status of the slide mechanism. A case of detecting the pulse frequency as the moving status value representing the status of the slide mechanism 13 will be described later with reference to FIG. 6.

The control device 20 controls an operation of the seat 10 configured as described above, and has an arithmetic logic unit and a memory unit. As shown in FIG. 1, the control device 20 includes an operation accepting unit 21, a detecting unit 22, a determining unit 23, and a drive control unit 24. The respective functions of the operation accepting unit 21, the detecting unit 22, the determining unit 23, and the drive control unit 24 can be implemented by execution of a program for implementing the respective functions stored in the memory unit by the arithmetic logic unit. Moreover, the control device 20 includes a determination criterion storing unit 25. The determination criterion storing unit 25 is configured by the memory unit.

The operation accepting unit 21 accepts an operation instruction to the seat 10 via the operating unit 12 by the operator such as a driver. In particular, in this example embodiment, the operation accepting unit 21 accepts an operation instruction for movement in the front-rear direction to the seat body 11. Then, the operation accepting unit 21 notifies the drive control unit 24 of the accepted operation instruction to move the seat body 11 in the front-rear direction. In response to this, the drive control unit 24 drives and controls the driving device 14 of the seat 10 to slide the seat body 11 in the front-rear direction.

Figure 4:
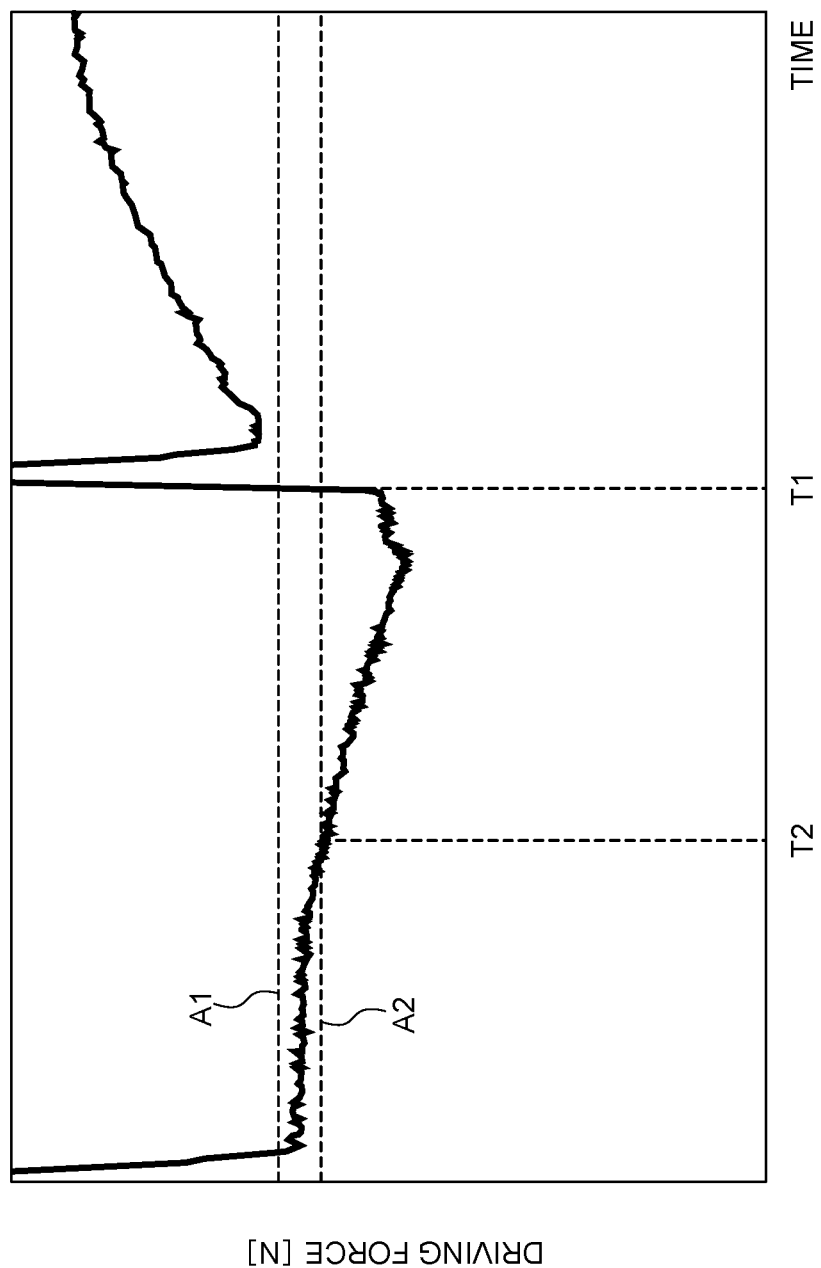
FIG. 4 is a figure showing an example of data processed in a control device disclosed in FIG. 1.

The detecting unit 22 acquires the value of a load applied to the slide mechanism 13 detected by the load detecting device 15. Herein, the detecting unit 22 acquires a load value indicated by a driving force as shown in FIG. 4. Since the load value is the driving force of the driving device 14 calculated from the values of voltage and current applied to the driving device 14 as described before, the load value increases as a load applied to the slide mechanism 13 in the front-rear direction of the vehicle increases. However, the detecting unit 22 is not limited to acquiring the abovementioned load value, and may acquire any moving status value that represents the status of the slide mechanism 13 moving the seat body 11 in the front-rear direction detected by the load detection device 15.

The determining unit 23 determines based on the detected load value whether or not something is pinched while the seat body 11 is moving in the front-rear direction. In particular, in this example embodiment, the determining unit 23 detects the occurrence of the pinch while the seat body 11 is moving rearward. Specifically, when the detected load value becomes more than a preset first threshold value A1 (first state) and when the detected load value becomes less than a second threshold value A2 that is set to a lower value than the first threshold value (second state) as shown in FIG. 4, the determining unit 23 determines that something is pinched, respectively.

It will be described with reference to FIGS. 2 to 4 that reference values for determining the occurrence of the pinch from a load value detected from the slide mechanism 13 by the determining unit 23 are set to the first threshold value A1 and the second threshold value A2. First, FIG. 2 shows a way of an operation of the rack and pinion serving as the slide mechanism 13 when no load is applied to the seat body 11 in the front-rear direction, such as when the vehicle is traveling on a flat place. At this time, the left figure of FIG. 2 shows the state of the rack and pinion when the seat body 11 is being moved rearward, and the right figure of FIG. 2 shows the state of the rack and pinion when something is pinched while the seat body 11 is being moved rearward. As shown in the right figure of FIG. 2, when something is pinched while the seat body 11 is being moved rearward, a load is applied to restrain the rotation of the pinion, and the driving force of the motor serving as the driving device 14 driving the pinion, that is, the load value of the slide mechanism 13 increases. Therefore, by detecting an increase in the load value shown in FIG. 4, it is possible to determine whether or not something is pinched. Consequently, by setting a value at which the load value starts increasing when something is pinched as the first threshold value A1, it is possible to determine that something is pinched in a case where the load value becomes more than the first threshold A1. The first threshold value is a value set by experiments or the like, and is stored in advance in the determination criterion storing unit 25.

Figure 3:
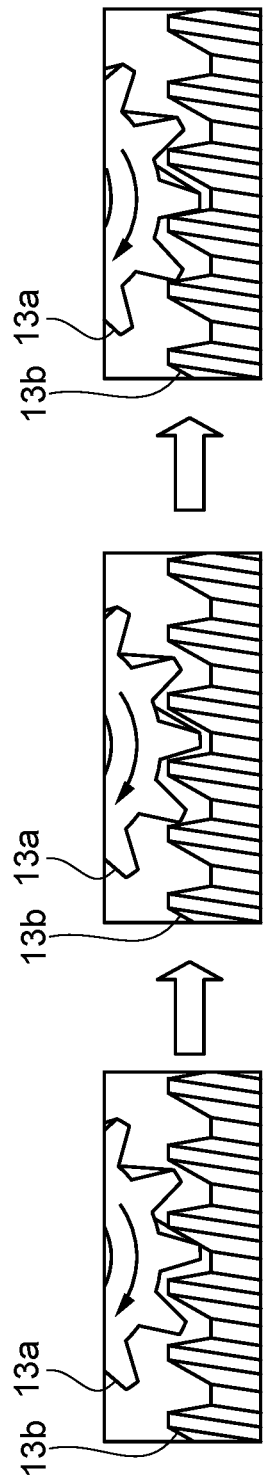
FIG. 3 is a figure showing a way of an operation of the driving mechanism of the seat disclosed in FIG. 1.

Further, FIG. 3 shows a way of an operation of the rack and pinion serving as the slide mechanism 13 when a rearward load is applied to the seat body 11, such as when the vehicle is traveling on a place that is inclined so as to climb in the traveling direction. At this time, the left figure of FIG. 3 shows the state of the rack and pinion when the seat body 11 is being moved rearward, and the middle figure of FIG. 3 shows the state of the rack and pinion when something is pinched while the seat body 11 is being moved rearward. Furthermore, the right figure of FIG. 3 shows the state of the rack and pinion when the pinch caused while the seat body 11 is being moved rearward still continues. The right figure of FIG. 3 shows the same status as in the right figure of FIG. 2, that is, the status of the rack and pinion in a case where something is pinched when no load is applied to the seat body 11 in the front-rear direction. Therefore, in a case where a rearward load is applied to the vehicle, a load value corresponding to the status in the right figure of FIG. 3 exceeds the first threshold value A1 at time T1 in FIG. 4, and a problem arises that the timing for determining the occurrence of the pinch is late.

Therefore, in this example embodiment, it is desirable to detect the status of the rack and pinion as shown in the middle figure of FIG. 3 from the load value. Then, in the status of the rack and pinion as shown in the middle figure of FIG. 3, the load of the rotation of the pinion is reduced compared to the status in the left figure of FIG. 3, and the driving force of the motor serving as the driving device 14 driving the pinion, that is, the load value of the slide mechanism 13 is reduced. Therefore, by detecting a decrease in the load value detected at and after time T2 in FIG. 4, it is possible to determine whether or not something is pinched. Consequently, by setting a value at which the load value starts decreasing when something is pinched in a status that a rearward load is caused in the vehicle as the second threshold value A2, it is possible to determine that something is pinched in a case where the load value becomes less than the second threshold value A2. The second threshold value A2 is a value lower than the first threshold value A1 set by experiments or the like, and is stored in advance in the determination criterion storing unit 25. The first threshold value A1 and the second threshold value A2 described above are set in accordance with a moving status value indicating the status of the slide mechanism 13 acquired by the detecting unit 22.

Figure 5:
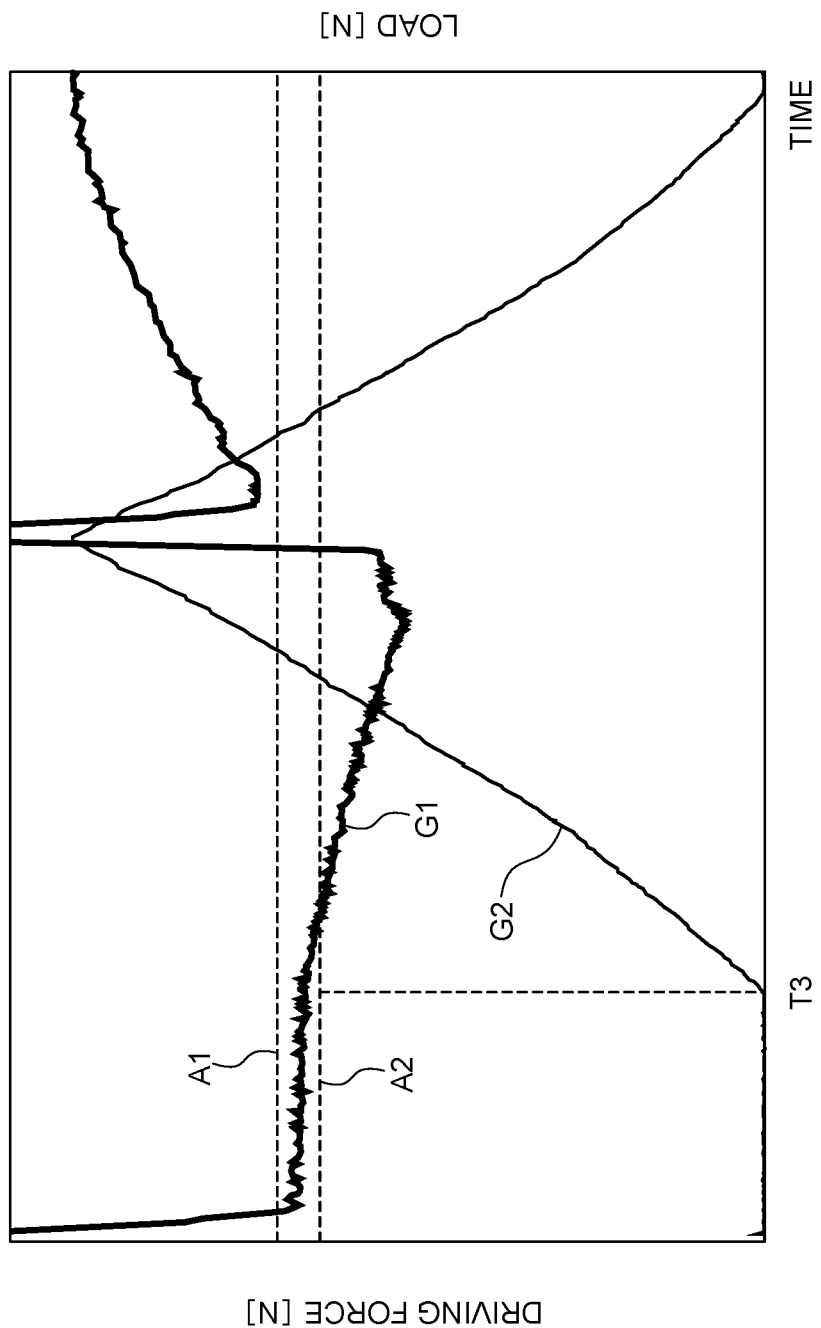
FIG. 5 is a figure showing an example of data processed in the control device disclosed in FIG. 1.
Figure 6:
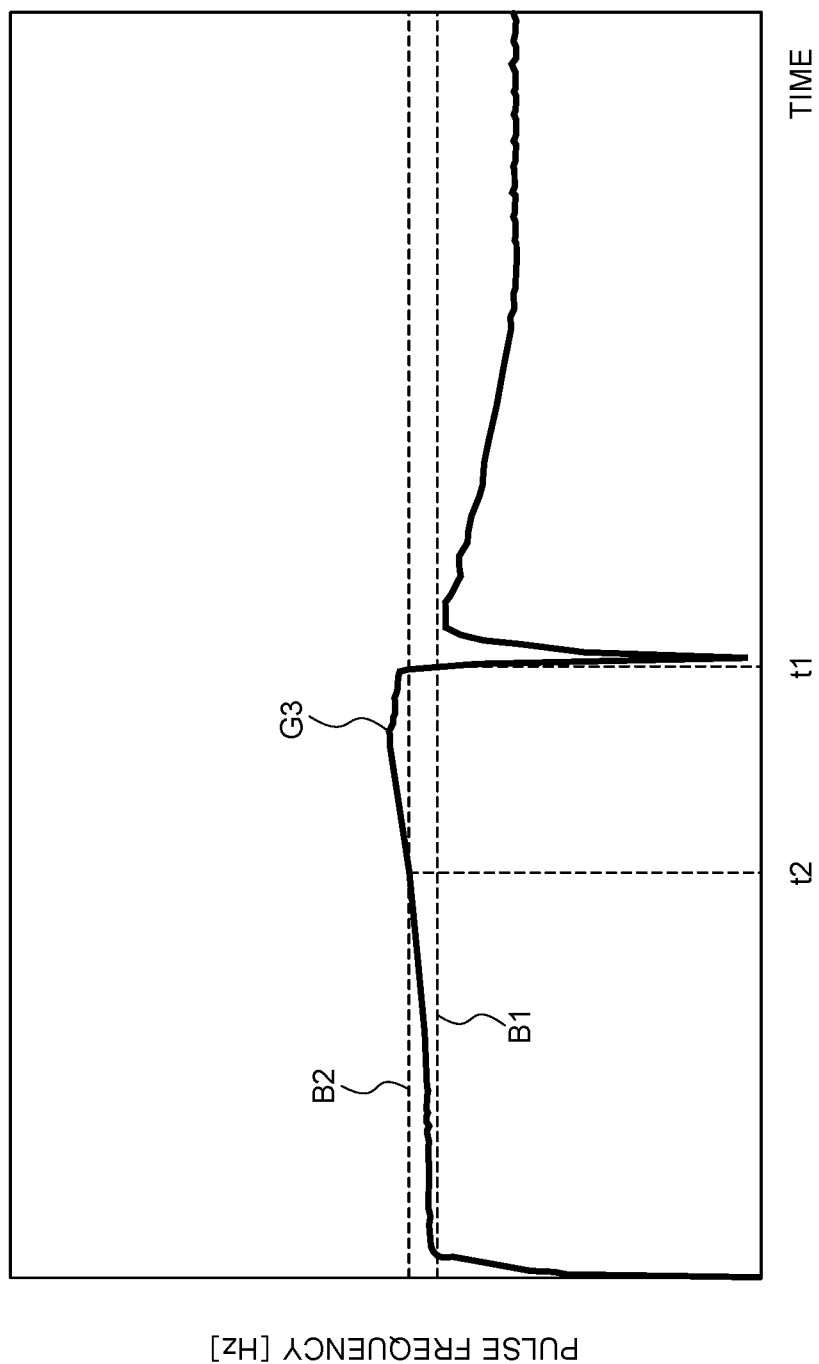
FIG. 6 is a figure showing an example of data processed in the control device disclosed in FIG. 1.

The determining unit 23 may perform the determination based on the load value described above in accordance with a load in the front-rear direction of the vehicle acting on the seat 10. In order to implement such a function, the detecting unit 22 (load detecting unit) also has a function of detecting a load in the front-rear direction of the vehicle acting on the seat 10 based on a measurement value measured by the load detection device 30. Here, the load detection device 30 is, for example, a tilt sensor that measures the tilt of a vehicle, an acceleration sensor that measures the acceleration of a vehicle, a strain sensor that measures a load applied to the seat body 11, or the like, and detects a load in the front-rear direction on the seat 10. That is to say, the detecting unit 22 not only measures a load in the front-rear direction due to the tilted state of the vehicle, but also detects a load due to acceleration and a load due to the seat body 11 pushed by the passenger from each sensor. In this example embodiment, as an example, by measuring a rearward load, it is detected that the vehicle is in a tilted state in which the vehicle is located uphill. Here, an example of the detected load is shown by a graph denoted by symbol G2 in FIG. 5. In FIG. 5, a graph denoted by symbol G1 shows the load value described above and shows the same graph as in FIG. 4

The detecting unit 22 detects the load state of the vehicle from the graph of the load detected as shown by symbol G2 in FIG. 5. For example, in a case where the load is 0, the detecting unit 22 determines that the load is less than a preset reference, and detects a state in which a rearward load is not applied to the vehicle (first load state). In a case where the load is more than at and after time T3 in FIG. 5, the detecting unit 22 determines that the load is equal to or more than the preset reference, and detects a state in which a rearward load is applied to the vehicle (second load state). Meanwhile, the detecting unit 22 may determine the load state using another value as a reference. Moreover, the detecting unit 22 may further detect the state in which a rearward load is applied (second load state) in multiple stages in accordance with the value of the load, and may detect a load state that requires correction by the determining unit 23 as will be described later, for example.

Then, the determining unit 23 performs the determination of the pinch based on the load value in accordance with the load state of the vehicle detected as described above. For example, the determining unit 23 may determine only whether or not the load value exceeds the first threshold when no rearward load is applied to the vehicle, and may determine only whether or not the load value is less than the second threshold value when a rearward load is applied to the vehicle.

In a case where the load state of the vehicle is the rearward load state as described above and the load state requires correction, the determining unit 23 may correct the second threshold value in accordance with the value of the load. That is to say, since the load acting on the seat body 11 may vary with a tilt angle at a place where the vehicle is traveling and the weight of the passenger, the second threshold value A2 is corrected in consideration of such variations. For example, the determining unit 23 may correct the second threshold to be lower as the load is higher.

The drive control unit 24 drives and controls the driving device 14 of the seat 10 so as to slide the seat body 11 in the front-rear direction in accordance with operation by the operator. In a case where it is determined that something is pinched by the sheet body 11 as described above, that is to say, in a case where the detected load value exceeds the first threshold value A1 (first state) and in a case where the detected load value becomes less than the second threshold value A2 (second state), the drive control unit 24 controls the driving device 14 to reverse the moving direction of the sheet body 11 or stop the movement.

Here, a case will be described in which the load detection device 15 and the detecting unit 22 (detecting unit) detects, instead of the load value of the slide mechanism 13 described above, the pulse frequency of the motor serving as the driving device 14 as a moving status value representing the status of the slide mechanism 13. For example, the pulse frequency of the motor is represented by a graph G3 shown on the vertical axis in FIG. 6. It can be said that the pulse frequency of the motor represents a moving speed in the front-rear direction of the seat body 11.

First, when something is pinched while the seat body 11 is being moved rearward as shown in the right figure of FIG. 2 from a status that no load is applied to the seat body 11 in the front-rear direction such as a state that the vehicle is traveling on a flat place as shown in the left figure in FIG. 2, the rotation of the pinion 13a is restrained and the pulse frequency (moving speed) decreases. Therefore, by detecting the decrease in the pulse frequency shown in FIG. 6, the determining unit 23 can determine whether or not something is pinched. Consequently, by setting a value at which the pulse frequency starts decreasing when something is pinched as a first threshold value B1, it is possible when the pulse frequency becomes less than the first threshold value B1 as shown at time t1 in FIG. 6 to determine that something is pinched. The first threshold value B1 is a value set by experiments or the like, and is stored in advance in the determination criterion storing unit 25.

On the other hand, when something is pinched while the seat body 11 is being moved rearward as shown in the middle figure of FIG. 3 from a status that a rearward load is applied to the seat body 11 such as a status that the vehicle is traveling on a place inclined uphill in the traveling direction as shown in the left figure in FIG. 3, the rotation of the pinion 13a is temporarily promoted and the pulse frequency (moving speed) increases. Therefore, by detecting the increase in the pulse frequency as shown at and after time t2 in FIG. 6, the determining unit 23 can determine whether or not something is pinched. Consequently, by setting a value at which the pulse frequency starts increasing when something is pinched in a status where a rearward load is applied to the vehicle as a second threshold value B2, it is possible when the pulse frequency exceeds the second threshold value B2 to determine that something is pinched. The second threshold value B2 is a value higher than the first threshold value B1 set by experiments or the like, and is stored in advance in the determination criterion storing unit 25.

Then, the determining unit 23 may perform the determination based on the pulse frequency described above in accordance with the load in the front-rear direction of the vehicle acting on the seat 10. That is to say, in the same manner as described above, the determining unit 23 may detect the load in the front-rear direction of the vehicle acting on the seat 10, and determine only whether or not the pulse frequency is less than the first threshold value B1 in a state where a rearward load is not applied to the vehicle and determine only whether or not the pulse frequency exceeds the second threshold value B2 in a state where a rearward load is applied to the vehicle. Moreover, in a case where the load state of the vehicle is a rearward load state and the load state requires correction, the determining unit 23 may correct the second threshold value B2 in accordance with the value of the load in the same manner as described above.

Operation

Next, an operation of the seat 10 and the control device 20 will be described mainly with reference to a flowchart of FIG. 7. Here, a case will be described in which the driving force of the motor serving as the driving device 14, that is, the value of a load applied to the slide mechanism 13 is detected as a moving status value representing the status of the slide mechanism 13 as shown in FIG. 4.

First, when the operating unit 12 of the seat 10 is operated by the operator, the control device 20 accepts an operation instruction and controls to move the seat body 11 in the operation direction (step S1). Here, the control device 20 controls so that the seat body 11 moves rearward. Then, the control device 20 starts detecting the value of a load applied to the slide mechanism 13 that drives the seat body 11 from the load detection device 15, and detecting a load applied to the seat body 11 from the load detection device 30 (step S2).

Subsequently, the control device 20 detects the state of the load applied to the seat body 11 from the detected load (step S3). Specifically, the control device 20 detects whether or not a rearward load is applied to the seat body 11. Then, the control device 20 detects that the vehicle is not in a tilted state when the rearward load is not applied, and detects that the vehicle is in the tilted state when the rearward load is applied. Then, the control device 20 detects that something is pinched by the seat body 11 from the load value detected in the following manner in accordance with whether or not the vehicle is in the tilted state.

In the case of detecting that the vehicle is not in the tilted state (No at step S4), the control device 20 checks whether or not the detected load value is more than the first threshold value A1 (step S5). At this time, in a case where the load value is more than the first threshold value A1 (Yes at step S5), the control device 20 determines that something is pinched by the seat body 11 (step S7). On the other hand, in the case of detecting that the vehicle is in the tilted state (Yes at step S4), the control device 20 checks whether or not the detected load value is less than the second threshold value A2 (step S6). At this time, in a case where the load value is less than the second threshold value A2 (Yes at step S6), the control device 20 determines that something is pinched by the seat body 11 (step S7).

In the case of determining that something is pinched by the seat body 11 as described above, the control device 20 controls to reverse the moving direction of the seat body 11, that is, shift from rearward movement to frontward movement, or stop the movement.

As described above, the seat state detection apparatus according to the present invention can accurately detect that something is pinched by the seat body 11 even when a load is applied to the seat body 11 such as when the vehicle is in the tilted state.

Supplementary Notes

The whole or part of the example embodiments disclosed above can be described as the following supplementary notes. The overview of an operation apparatus according to the present invention will be described below. However, the present invention is not limited to the following configurations.

Supplementary Note 1

A seat state detection apparatus comprising:
a detecting unit configured to, in accordance with a moving operation in a front-rear direction by an operator on a seat of a vehicle, detect a moving status value representing a status of a moving mechanism that moves the seat in the front-rear direction; and
a determining unit configured to determine that the moving mechanism is in a first state when the detected moving status value is more than a first threshold value, and determine that the moving mechanism is in a second state when the detected moving status value is less than a second threshold value set to a value lower than the first threshold value.

Supplementary Note 2

The seat state detection apparatus according to Supplementary Note 1, wherein:
the detecting unit is configured to detect a load value on the moving mechanism as the moving status value; and
the determining unit is configured to determine that the moving mechanism is in the first state when the detected load value is more than the first threshold value, and determine that the moving mechanism is in the second state when the detected load value is less than the second threshold value.

Supplementary Note 3

The seat state detection apparatus according to Supplementary Note 2, wherein the detecting unit is configured to detect the load value that increases as a load on the moving mechanism in the front-rear direction of the vehicle increases.

Supplementary Note 4

The seat state detection apparatus according to Supplementary Note 3, further comprising a load detecting unit configured to detect a load in the front-rear direction of the vehicle acting on the seat, wherein the determining unit is configured to, in accordance with the detected load, determine that the moving mechanism is in the second state when the moving status value is less than the second threshold value.

Supplementary Note 5

The seat state detection apparatus according to Supplementary Note 4, wherein:

the load detecting unit is configured to detect whether the vehicle is in a first load state in which the load is less than a preset reference or a second load state in which the load is equal to or more than a preset reference; and the determining unit is configured to, when detected that the vehicle is in the first load state, check whether or not the moving status value is more than the first threshold value to determine whether or not the moving mechanism is in the first state and, when detected that the vehicle is in the second load state, check whether or not the moving status value is less than the second threshold value to determine whether or not the moving mechanism is in the second state.

Supplementary Note 6

The seat state detection apparatus according to Supplementary Note 4, wherein the determining unit is configured to correct the second threshold value in a predetermined manner in accordance with the load and perform the determination using the corrected second threshold value.

Supplementary Note 7

The seat state detection apparatus according to Supplementary Note 5 or 6, wherein the determining unit is configured to, when determining that the moving mechanism is in the first state and the second state, determine that something is pinched by the seat.

Supplementary Note 8

The seat state detection apparatus according to Supplementary Note 7, wherein when determined to be in the first state and the second state, the moving mechanism moves to reverse a direction of movement of the seat or stop the movement.

Supplementary Note 9

A seat state detection method comprising:

in accordance with a moving operation in a front-rear direction by an operator on a seat of a vehicle, detecting a moving status value representing a status of a moving mechanism that moves the seat in the front-rear direction; and determining that the moving mechanism is in a first state when the detected moving status value is more than a first threshold value, and determining that the moving mechanism is in a second state when the detected moving status value is less than a second threshold value set to a value lower than the first threshold value.

Supplementary Note 10

A seat state detection apparatus comprising:

a detecting unit configured to, in accordance with a moving operation in a front-rear direction by an operator on a seat of a vehicle, detect a moving status value representing a status of a moving mechanism that moves the seat in the front-rear direction; and a determining unit configured to determine that the moving mechanism is in a first state when the detected moving status value is less than a first threshold value, and determine that the moving mechanism is in a second state when the detected moving status value is more than a second threshold value set to a value higher than the first threshold value.

Although the present invention has been described above with reference to the example embodiments, the present invention is not limited to the above example embodiments. The configurations and details of the present invention can be changed in various manners that can be understood by one skilled in the art within the scope of the present invention.

DESCRIPTION OF NUMERALS

10 seat
11 seat body
12 operating unit
13 moving mechanism
14 driving device
15 load detection device
20 control device
21 operation accepting unit
22 detecting unit
23 determining unit
24 drive control unit
25 determination criterion storing unit
30 load detection device

The invention claimed is:

1. A seat state detection apparatus comprising:
   a detecting unit configured to, in accordance with a moving operation in a front-rear direction by an operator on a seat of a vehicle, detect a moving status value representing a status of a moving mechanism that moves the seat in the front-rear direction; and
   a determining unit configured to determine that the moving mechanism is in a first state when the detected moving status value is more than a first threshold value, and determine that the moving mechanism is in a second state when the detected moving status value is less than a second threshold value set to a value lower than the first threshold value,
   wherein
   the determining unit is configured to, when determining that the moving mechanism is in either the first state or the second state, determine that something is pinched by the seat.

2. The seat state detection apparatus according to claim 1, wherein:
   the detecting unit is configured to detect a load value on the moving mechanism as the moving status value; and
   the determining unit is configured to determine that the moving mechanism is in the first state when the detected load value is more than the first threshold value, and determine that the moving mechanism is in the second state when the detected load value is less than the second threshold value.

3. The seat state detection apparatus according to claim 2, wherein
the detecting unit is configured to detect the load value that increases as a load on the moving mechanism in the front-rear direction of the vehicle increases.

4. The seat state detection apparatus according to claim 3, further comprising
a load detecting unit configured to detect a load in the front-rear direction of the vehicle acting on the seat,
wherein the determining unit is configured to, in accordance with the detected load, determine that the moving mechanism is in the second state when the moving status value is less than the second threshold value.

5. The seat state detection apparatus according to claim 4, wherein:
the load detecting unit is configured to detect whether the vehicle is in a first load state in which the load is less than a preset reference or a second load state in which the load is equal to or more than a preset reference; and
the determining unit is configured to, when detected that the vehicle is in the first load state, check whether or not the moving status value is more than the first threshold value to determine whether or not the moving mechanism is in the first state and, when detected that the vehicle is in the second load state, check whether or not the moving status value is less than the second threshold value to determine whether or not the moving mechanism is in the second state.

6. The seat state detection apparatus according to claim 4, wherein
the determining unit is configured to correct the second threshold value in a predetermined manner in accordance with the load and perform the determination using the corrected second threshold value.

7. The seat state detection apparatus according to claim 5, wherein
when determined to be in the first state and the second state, the moving mechanism moves to reverse a direction of movement of the seat or stop the movement.

8. A seat state detection method comprising:
in accordance with a moving operation in a front-rear direction by an operator on a seat of a vehicle, detecting a moving status value representing a status of a moving mechanism that moves the seat in the front-rear direction; and
determining that the moving mechanism is in a first state when the detected moving status value is more than a first threshold value, and determining that the moving mechanism is in a second state when the detected moving status value is less than a second threshold value set to a value lower than the first threshold value,
wherein
the determining unit is configured to, when determining that the moving mechanism is in either the first state or the second state, determine that something is pinched by the seat.

9. A seat state detection apparatus comprising:
a detecting unit configured to, in accordance with a moving operation in a front-rear direction by an operator on a seat of a vehicle, detect a moving status value representing a status of a moving mechanism that moves the seat in the front-rear direction; and
a determining unit configured to determine that the moving mechanism is in a first state when the detected moving status value is less than a first threshold value, and determine that the moving mechanism is in a second state when the detected moving status value is more than a second threshold value set to a value higher than the first threshold value,
wherein
the determining unit is configured to, when determining that the moving mechanism is in either the first state or the second state, determine that something is pinched by the seat.

10. A seat state detection apparatus comprising:
a detecting unit configured to, in accordance with a moving operation in a front-rear direction by an operator on a seat of a vehicle, detect a moving status value representing a status of a moving mechanism that moves the seat in the front-rear direction; and
a determining unit configured to determine that the moving mechanism is in a first state when the detected moving status value is more than a first threshold value, and determine that the moving mechanism is in a second state when the detected moving status value is less than a second threshold value set to a value lower than the first threshold value,
wherein the first threshold value and second threshold value are preset.

11. The seat state detection apparatus according to claim 10, wherein:
the detecting unit is configured to detect a load value on the moving mechanism as the moving status value; and
the determining unit is configured to determine that the moving mechanism is in the first state when the detected load value is more than the first threshold value, and determine that the moving mechanism is in the second state when the detected load value is less than the second threshold value.

12. The seat state detection apparatus according to claim 11, wherein
the detecting unit is configured to detect the load value that increases as a load on the moving mechanism in the front-rear direction of the vehicle increases.

13. The seat state detection apparatus according to claim 12, further comprising
a load detecting unit configured to detect a load in the front-rear direction of the vehicle acting on the seat,
wherein the determining unit is configured to, in accordance with the detected load, determine that the moving mechanism is in the second state when the moving status value is less than the second threshold value.

14. The seat state detection apparatus according to claim 13, wherein:
the load detecting unit is configured to detect whether the vehicle is in a first load state in which the load is less than a preset reference or a second load state in which the load is equal to or more than a preset reference; and
the determining unit is configured to, when detected that the vehicle is in the first load state, check whether or not the moving status value is more than the first threshold value to determine whether or not the moving mechanism is in the first state and, when detected that the vehicle is in the second load state, check whether or not the moving status value is less than the second threshold value to determine whether or not the moving mechanism is in the second state.

15. The seat state detection apparatus according to claim 13, wherein the determining unit is configured to correct the second threshold value in a predetermined manner in accordance with the load and perform the determination using the corrected second threshold value.

16. The seat state detection apparatus according to claim 14, wherein
when determined to be in the first state and the second state, the moving mechanism moves to reverse a direction of movement of the seat or stop the movement.

* * * * *